US009145057B2

United States Patent
Jung (10) Patent No.: US 9,145,057 B2
(45) Date of Patent: Sep. 29, 2015

(54) CONTROL METHOD FOR SHORTENING START TIME OF ELECTRIC VEHICLE

(71) Applicants: Hyundai Motor Company, Seoul (KR); Kia Motors Corporation, Seoul (KR)

(72) Inventor: Tae Young Jung, Hwaseong-si (KR)

(73) Assignees: HYUNDAI MOTOR COMPANY, Seoul (KR); Kia Motors Corporation, Seoul (KR)

( * ) Notice: Subject to any disclaimer, the term of this patent is extended or adjusted under 35 U.S.C. 154(b) by 152 days.

(21) Appl. No.: 13/828,206

(22) Filed: Mar. 14, 2013

(65) Prior Publication Data

US 2014/0188314 A1 Jul. 3, 2014

(30) Foreign Application Priority Data

Dec. 28, 2012 (KR) .................... 10-2012-0155825

(51) Int. Cl.
 *B60W 10/00* (2006.01)
 *B60L 15/00* (2006.01)
 *B60W 20/00* (2006.01)
 *B60L 1/00* (2006.01)
 *B60L 1/02* (2006.01)
 *B60L 11/18* (2006.01)

(52) U.S. Cl.
 CPC . *B60L 1/003* (2013.01); *B60L 1/02* (2013.01); *B60L 1/20* (2013.01); *B60L 11/1851* (2013.01); *B60L 2210/10* (2013.01); *B60L 2220/44* (2013.01); *B60L 2240/10* (2013.01); *B60L 2240/36* (2013.01); *B60L 2240/80* (2013.01); *B60L 2260/20* (2013.01); *B60L 2270/00* (2013.01); *Y02T 10/7005* (2013.01); *Y02T 10/705* (2013.01); *Y02T 10/7216* (2013.01)

(58) Field of Classification Search
 CPC ........ B60L 15/00; B60W 10/00; B60W 20/00
 USPC .......................................................... 701/22
 See application file for complete search history.

(56) References Cited

U.S. PATENT DOCUMENTS

2012/0138261 A1* 6/2012 Park et al. ...................... 165/43
2013/0211678 A1* 8/2013 Lee et al. ....................... 701/42

FOREIGN PATENT DOCUMENTS

JP   05-268794   10/1993
JP   08-088996   4/1996

(Continued)

OTHER PUBLICATIONS

NPL english translation from JPO, Dec. 20, 2012.*

*Primary Examiner* — Fadey Jabr
*Assistant Examiner* — Yazan A Soofi
(74) *Attorney, Agent, or Firm* — McDermott Will & Emery LLP (57) ABSTRACT

A control method for shortening a start time of an electric vehicle quickly removes electricity remaining in a system without adding a separate component. The control method includes comparing a DC-link voltage in an inverter for driving a driving motor with a first reference value in a state in which the connection between a main battery and a vehicle system is released; checking a remaining voltage in the vehicle system and comparing the checked remaining voltage with a second reference value, when the DC-link voltage in the inverter is no less than the first reference value; removing the remaining voltage by operating an electric load in the vehicle so as to consume remaining electricity in the vehicle system, when the remaining voltage is no less than the second reference value; and connecting the main battery to the vehicle system by turning on a pre-charge relay and a main relay.

5 Claims, 5 Drawing Sheets (56) References Cited

FOREIGN PATENT DOCUMENTS

| | | |
|---|---|---|
| JP | 09-037583 | 2/1997 |
| JP | 2001-161094 | 6/2001 |
| JP | 2012253837 A * | 12/2012 |
| KR | 10-0156111 B1 | 4/1994 |
| KR | 10-2001-0068048 A | 7/2001 |

* cited by examiner

CONTROL METHOD FOR SHORTENING START TIME OF ELECTRIC VEHICLE

CROSS-REFERENCE TO RELATED APPLICATION

This application claims under 35 U.S.C. §119(a) the benefit of priority to Korean Patent Application No. 10-2012-0155825 filed Dec. 28, 2012, the entire contents of which are incorporated herein by reference.

TECHNICAL FIELD

The present disclosure relates to a control method for shortening a start time of an electric vehicle. More particularly, the present disclosure relates to a control method which can shorten a start time of an electric vehicle by quickly removing electricity remaining in a system without adding a separate component.

BACKGROUND

In recent years, green vehicles that can substitute for existing internal-combustion engine vehicles are actively developed due to a high oil price, regulations of carbon dioxide emissions, and the like. An electric vehicle traveling by driving an electric motor and a hybrid vehicle using an internal-combustion engine and an electric motor as a driving source have been or will be commercialized according to manufacturers.

An in-wheel motor vehicle, which has an electric motor (driving motor) mounted to each wheel using power of batteries as a power source, is being developed among electric vehicles. The in-wheel motor vehicle is a vehicle in which power is transmitted directly to each wheel by the electric motor disposed inside a wheel rim of the wheel.

Thus, in a case where the in-wheel motor is applied to an electric vehicle, a power transmission apparatus such as a transmission or differential gear can be omitted, so that it is possible to decrease the weight of the vehicle and to reduce energy loss caused by a power transmission process.

Recently, an electric bus having an in-wheel motor technique applied thereto (referred to as an 'in-wheel electric bus' hereinafter) has been developed. The in-wheel electric bus uses a high voltage (e.g., 486 to 784V) as compared with an ordinary electric vehicle.

Accordingly, a relay in a battery system is not turned off due to its fusion frequently in a hybrid electric vehicle (HEV), a plug-in hybrid vehicle (PHEV), an electric vehicle (EV), etc., using a high voltage, which is undesirable.

Accordingly, the high voltage in the battery system is not released, or a fire or the like occurs due to heat generated in a resistance load in the fusion of the relay.

Thus, when a high-voltage battery is re-connected to a load such as each in-wheel motor (i.e., an inverter in a motor controller) in a vehicle driving system (e.g., in a restart after idle stop), whether the relay is turned off is checked by verifying a remaining current and its charging state in the system, particularly before each relay of a power relay assembly (PRA) is turned on. Here, the PRA performs switching so that the power of the battery is selectively supplied to an electric load in a vehicle.

Figure 1:
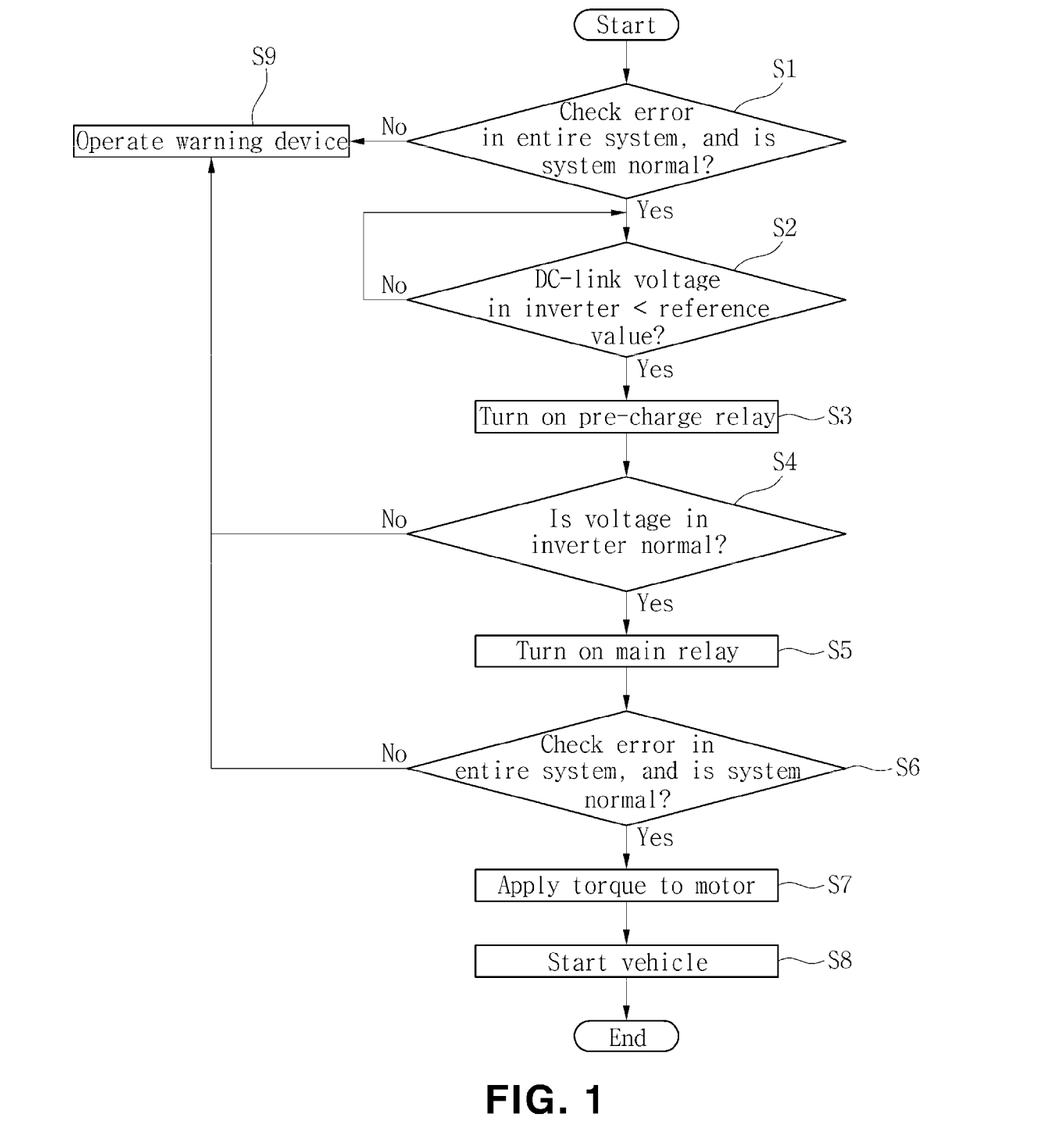
FIG. 1 is a flowchart illustrating a restart process including a process of verifying whether a relay is fused in a related art system.

Typically, whether a relay is fused or not is verified by checking a DC-link voltage in an inverter for in-wheel motor as shown in FIG. 1 before a high-voltage battery (main battery) is connected to an inverter of each in-wheel motor (driving motor) (S2). In a case where it is verified that the DC-link voltage in the inverter is less than a reference voltage in the checking process, a pre-charge relay and a main relay (high-voltage (−)/(+) relay) are sequentially turned on (S3 and S5).

However, it takes a long time to check whether the relay is turned off by verifying the discharging state of remaining current until the remaining current in the system is discharged, i.e., until the DC-link voltage in the inverter is less than the reference value.

Accordingly, it takes a long time to check the status of the relay whenever the battery is connected to the in-wheel motor, since the in-wheel electric bus starts after the idle stop. This lengthens the start time of the in-wheel electric bus, which is undesirable.

Figure 2:
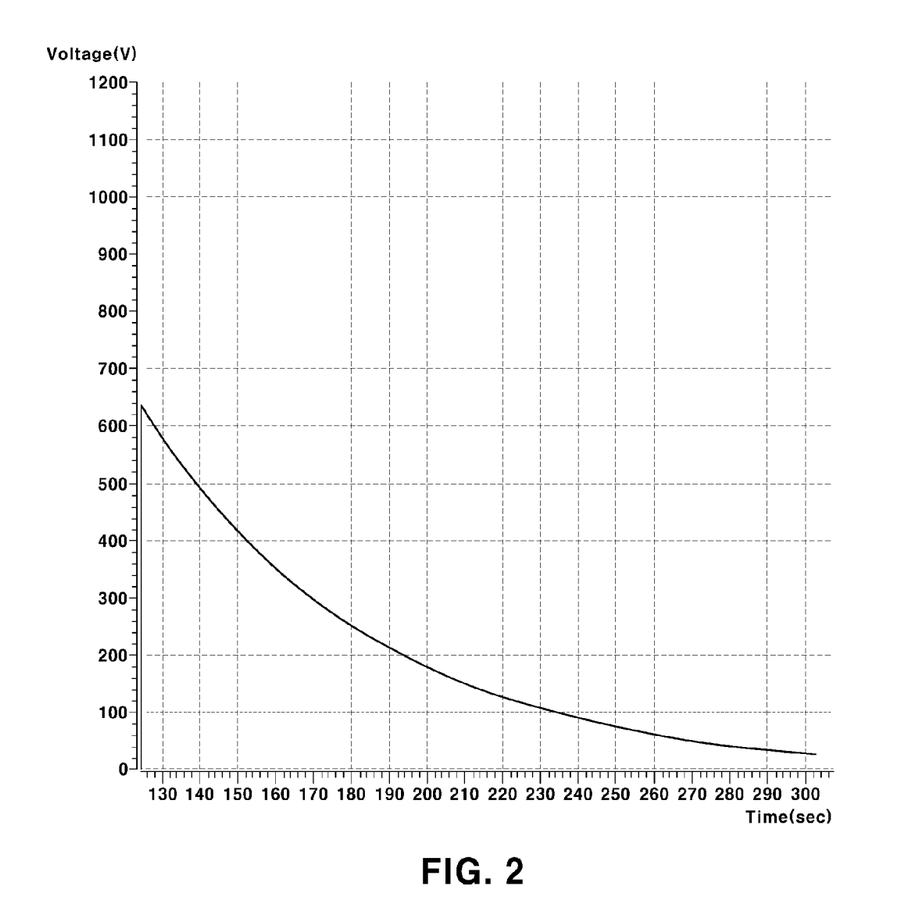
FIG. 2 is a graph illustrating a problem according to the related art.

FIG. 2 is a graph showing a state in which remaining current drops in a conventional system. Here, the vertical axis represents a remaining voltage (V) in the system, and the horizontal axis represents time (sec).

As shown in FIG. 2, it takes a long time until the remaining voltage gradually drops and then becomes less than the reference value. Hence, there is a problem in that inspection waiting time and control time are lengthened when the in-wheel electric bus starts.

A method of setting the reference value (V), at which the relay is re-joined, to be high is used for the purpose of shortening a start time of the in-wheel electric bus. In this case, although the relay is substantially fused, an instantaneous discharge is generated by another variable. Hence, there may exist a state in which the DC-link voltage in the inverter is less than the reference value (set to high as described above). Therefore, a need exists for performing a process of additionally verifying the state. Further, the number of variables increases, and therefore, the control becomes complicated.

Alternatively, a method of adding a discharging resistor to a single component in the system is introduced. In the method, a discharging resistor and a cable are additionally connected to a single component in the driving system of the in-wheel electric bus, e.g., a motor control unit (MCU), auxiliary machinery inverter, low-voltage DC/DC converter (LDC), high-voltage junction box, etc. The method, however, increases the number, size or price of the single component Therefore, the method has a negative influence on the optimization of the system.

SUMMARY OF THE DISCLOSURE

The present disclosure provides a control method which can shorten a start time of an electric vehicle by quickly removing electricity remaining in a system without adding a separate component.

One aspect of the present disclosure provides a control method for shortening a start time of an electric vehicle, including: comparing a DC-link voltage in an inverter for driving a driving motor with a first reference value in a state in which the connection between a main battery and a vehicle system is released; checking a remaining voltage in the vehicle system and comparing the checked remaining voltage with a second reference value, when the DC-link voltage in the inverter is no less than the first reference value; removing the remaining voltage by operating an electric load in the vehicle so as to consume remaining electricity in the vehicle system, when the remaining voltage is no less than the second reference value; and connecting the main battery to the vehicle system by turning on a pre-charge relay and a main relay.

In an exemplary embodiment, the electric load in the vehicle may be an electrical heater for indoor heating or a heating resistor for heating hot water, which is receives operating power applied from the vehicle system.

In another exemplary embodiment, the heating resistor may consume the remaining electricity by operating a chopper under the condition in which the remaining voltage is no less than the second reference value and the temperature of water is no more than a reference temperature.

In still another exemplary embodiment, if the DC-link voltage in the inverter is dropped below the first reference value after the electric load in the vehicle is operated, the pre-charge relay and the main relay may be turned on.

In yet another exemplary embodiment, the remaining voltage in the vehicle system may be a voltage at an input or output terminal of a motor control unit (MCU) for controlling the driving motor in a vehicle driving system.

In still yet another exemplary embodiment, the electric vehicle may be an in-wheel motor vehicle having the driving motor mounted to each wheel.

Other aspects and exemplary embodiments of the disclosure are discussed infra.

In the control method for shortening a start time according to the present disclosure, the remaining voltage in the system can become more quickly dropped to the reference value or less, using a heater (heating resistor that is a resistance load) previously mounted to the vehicle, only by simply changing the control logic without adding a separate component. Accordingly, it is possible to remarkably shorten the time required until the relay is turned on and the motor is driven.

Accordingly, it is possible to shorten a restart time of the in-wheel electric bus, to effectively prevent loss of resistance due to the remaining current and fusion of the relay, and to increase the quality of the vehicle by improving user safety.

Further, it is possible to solve a problem in the long control time in the conventional method and to solve several problems occurring in the conventional method, such as an increase in the number, size or price of the single component due to additional connection of a discharging resistor/cable of a single component in the system.

The above and other features of the invention are discussed infra.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept, and wherein.

It should be understood that the appended drawings are not necessarily to scale, presenting a somewhat simplified representation of various preferred features illustrative of the basic principles of the invention concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

Figure 3:
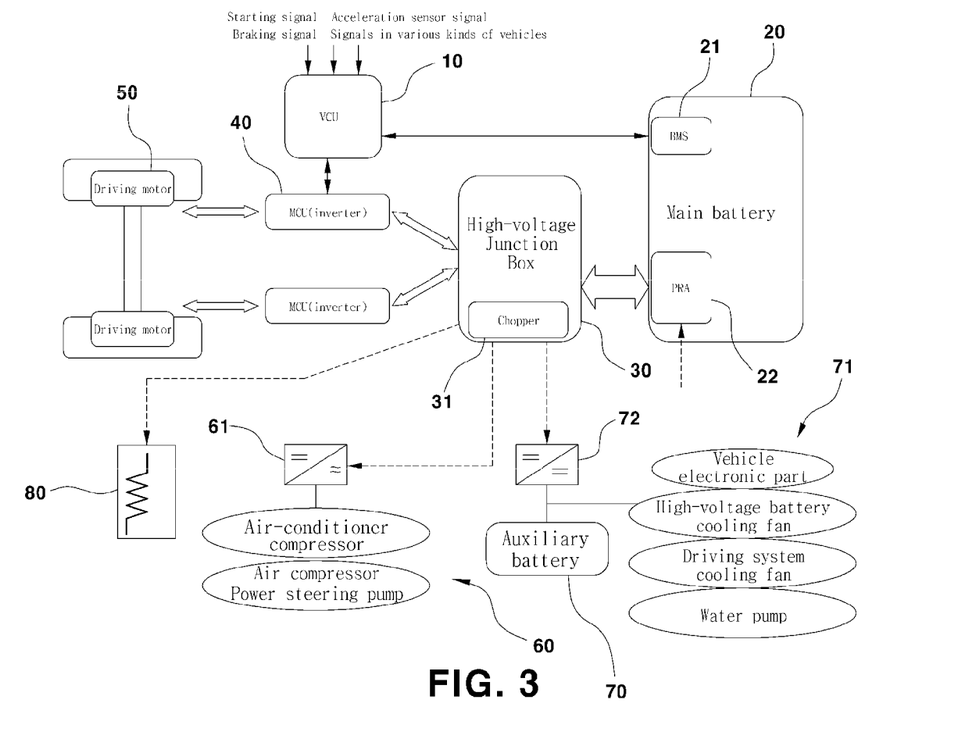
FIG. 3 is a schematic view illustrating the configuration of a power network of an in-wheel electric vehicle.
Figure 4:
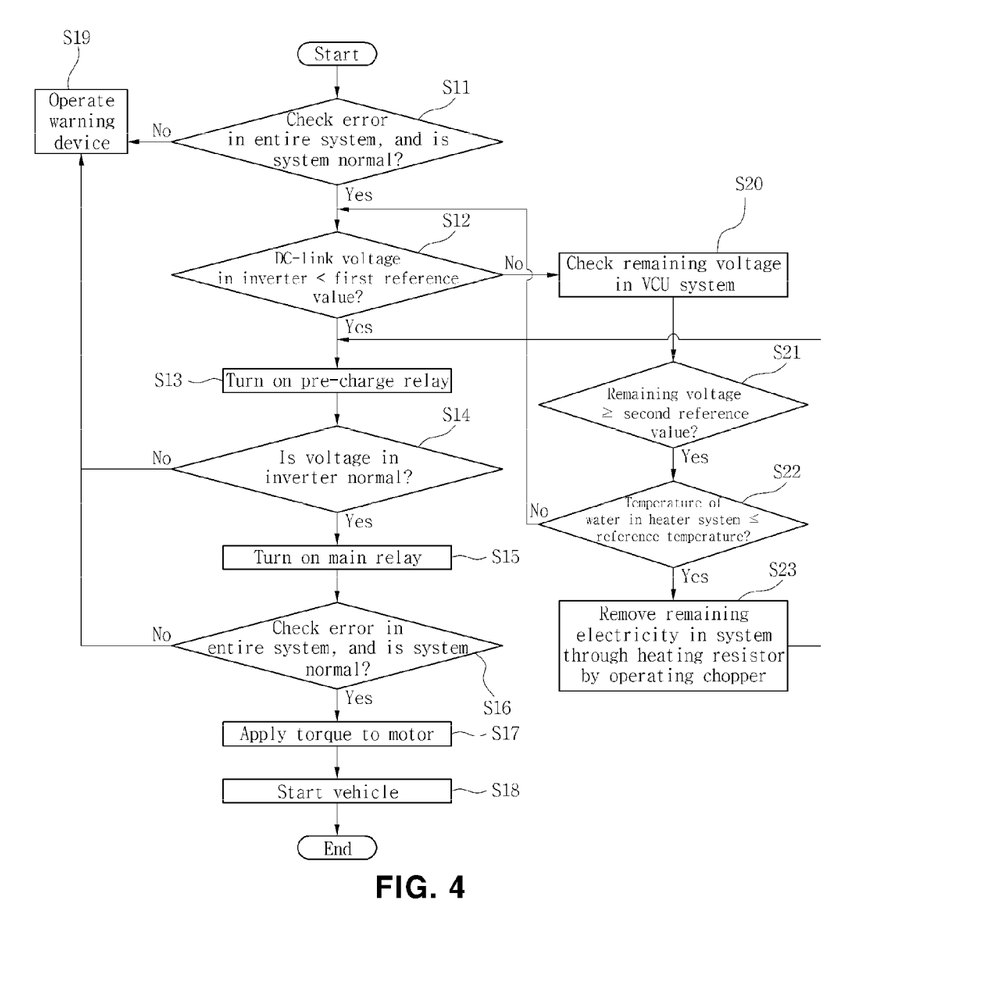
FIG. 4 is a flowchart illustrating a control process according to an embodiment of the present disclosure.

FIG. 3 is a schematic view illustrating the configuration of a power network of an in-wheel electric vehicle. FIG. 4 is a flowchart illustrating a control process according to an embodiment of the present disclosure.

Referring to FIG. 3, the in-wheel electric vehicle (e.g., the in-wheel electric bus) includes an in-wheel motor (driving motor) 50 mounted to each wheel, an inverter and motor control unit (MCU) 40 for driving each in-wheel motor 50, a main battery (high-voltage battery) 20 that provides power for driving a high-voltage auxiliary machinery including the in-wheel motor 50 as a major power source of the vehicle, and a battery management system (BMS) 21.

The in-wheel electric vehicle further includes a vehicle control unit (VCU) 10, a power relay assembly (PRA) 22 switching so that the power of the main battery 20 is selectively supplied, a high-voltage junction box 30 configured between the main battery 20 and a load in the vehicle, a high-voltage auxiliary machinery (high-voltage electric load) 60, for example, an air-conditioner compressor and air compressor power steering pump, an auxiliary machinery inverter 61, an auxiliary battery (low-voltage battery) 70, a low-voltage electric load 71, for example, Vehicle electronic part, high-voltage battery cooling fan, driving system cooling fan, and water pump, operated by receiving power of the auxiliary battery 70, a low-voltage DC/DC converter (LDC) 72 performing a power conversion between the high-voltage side and the auxiliary battery 70.

Here, the VCU 10 is a most significant controller that collects various kinds of information in the vehicle, and performs a control of the vehicle through communication with the other controller such as the MCU 40 or BMS 21. Basically, the controllers in the vehicle perform the control of the vehicle while transmitting/receiving information therebetween through communication.

For example, the VCU 10 computes a torque, based on the information collected in the vehicle so as to control driving of the in-wheel motor (driving motor), and the MCU 40 receives the computed torque from the VCU 10 so as to control the driving of the driving motor.

One skilled in the art will appreciate that the PRA 22 is configured to include a pre-charge relay (not shown) and a (+)/(−) terminal main relay (not shown). The relays are controlled to be turned on/off in response to a relay control signal output from the BMS 21.

Meanwhile, when the vehicle is restarted after the system of the vehicle is stopped, i.e., when the vehicle is restarted after key-off or in a state of battery-off (relay-off of the PRA)

in which the connection between the main battery and the system gets released, the VCU 10 that is the most significant controller verifies a remaining voltage of the system. In a case where the remaining voltage is no less than a predetermined level, the remaining voltage becomes quickly removed, using a heater system previously mounted in the vehicle.

A heater system for indoor heating of the vehicle, i.e., a heating resistor 80 heating and supplying water for indoor heating is mounted in the in-wheel electric bus.

The heating resistor 80 is an electric heating device that can be used as a source of heating in place of the existing internal-combustion engine. The heating resistor 80 receives power supplied under the operation of a chopper 31 in the high-voltage junction box 30, and accordingly heats and supplies hot water for heating.

In the present example, the heating resistor 80 previously mounted in the vehicle is used as an electric load for removing remaining electricity so as to shorten a start time. When the remaining electricity becomes removed, the chopper 31 operates in response to a control signal of the VCU 10, thereby supplying power to the heating resistor 80.

The heating resistor 80 is an electric load to receive power applied from the system. Thus, when the relay of the PRA 22 is abnormally fused or when the remaining electricity in the system including the connection circuit abnormally exists, the heating resistor 80 is electrically connected to the system by operating the chopper 31. Accordingly, the heating resistor 80 can consume the remaining electricity in the system.

In the present example, the remaining electricity in the system becomes quickly removed through the heating resistor 80 used for indoor heating, thereby quickly dropping the voltage to the reference value or less. Subsequently, the relay is turned on so that the main battery 20 is connected to the inverter of each in-wheel motor 50, thereby shortening the start time.

When the heating resistor 80 is used to quickly remove the remaining electricity, the control logic is configured so that the remaining electricity in the system is removed by operating the chopper 31 and the heating resistor 80 only when the remaining voltage in the system is no less than a specific voltage and when the temperature of water satisfies a temperature condition in which the heating resistor 80 can be safely used.

Hereinafter, the control process of the present disclosure will be described in detail with reference to FIG. 4.

Referring to FIG. 4, the relays are sequentially turned on by operating the heating resistor for verifying whether the relay in the system is fused, verifying the remaining voltage and removing the remaining electricity, so that a restarting process of connecting the main battery and the inverter of each in-wheel motor is performed.

First, the VCU 10 that is the most significant controller checks an error in the entire system by receiving diagnosis results of the individual devices and the system through communication with the other controllers including the BMS 21, the MCU (including the inverter) 40 for each in-wheel motor 50, the controller for the chopper, the controller for the auxiliary machinery inverter, and the like (S11).

In a case where an error in the system occurs, a warning is issued by a warning device (S19). In a case where no error in the system occurs, the VCU 10 verifies whether the DC-link voltage in the inverter for each in-wheel motor (driving motor) 50 exceeds a predetermined first reference value (S12).

If the DC-link voltage in the inverter is less than the first reference value, the BMS 21 receiving a signal transmitted from the VCU 10 turns on the pre-charge relay of the PRA 22.

Subsequently, if the DC-link voltage in the inverter is in a normal state of a regulated voltage or less, the VCU 10 turns on the (+)/(−) terminal main relay (S14 and S15), so that the main battery is connected to the load (i.e., the inverter of the MCU) through the high-voltage junction box.

If the main battery 20 is connected as described above, the VCU 10 re-checks whether an error in the entire system occurs (S16). In a case where no error occurs, the VCU 10 applies torque to the motor so that the vehicle starts (S17 and S18).

If the system is not in the normal state because the DC-link voltage in the inverter exceeds the regulated voltage after the pre-charge relay is turned on or if it is verified that an error in the entire system has occurred after the main relay is turned on, the warning is issued by the warning device (S19).

In a case where the DC-link voltage in the inverter is lower than the first reference value under the control between the VCU 10 and the BMS, 21 the vehicle starts by turning on each relay.

Meanwhile, in a case where the DC-link voltage in the inverter is no less than the first reference value, a control process for consuming remaining electricity in the system is additionally performed. In this case, the VCU 10 first decides whether the heating resistor can operate.

That is, in a case where the DC-link voltage in the inverter is no less than the first reference value in step S12, the control process for consuming the remaining electricity in the system is performed, and the remaining voltage in the driving system is checked (S20). If the remaining voltage in the driving system is no less than a predetermined second reference value, it is verified whether the temperature of water in the heater system is no less than a reference temperature (S21 and S22).

Here, the remaining voltage in the driving system may be a voltage at an input or output terminal of the MCU controlling the driving of the in-wheel motor.

If the remaining voltage in the driving system is no less than the second reference value, and the temperature of water in the heater system is no less than the reference temperature, the VCU 10 transmits a command to the chopper in the high-voltage junction box 30 so as to operate the heating resistor (S23). Accordingly, the remaining electricity in the system can be consumed by the heating resistor.

The heating resistor is operated as described above, so that the remaining electricity can be quickly removed. Subsequently, the operation of the heating resistor stops in the state in which the remaining electricity is removed, and steps S12 to S17 are identically performed, thereby starting the vehicle.

According to the control method of the present disclosure, the remaining voltage in the system can become more quickly dropped to the reference value or less, using existing components mounted to the vehicle, only by simply changing the control logic without adding a separate component. Accordingly, it is possible to remarkably shorten the time required until the relay is turned on and the motor is driven.

Figure 5:
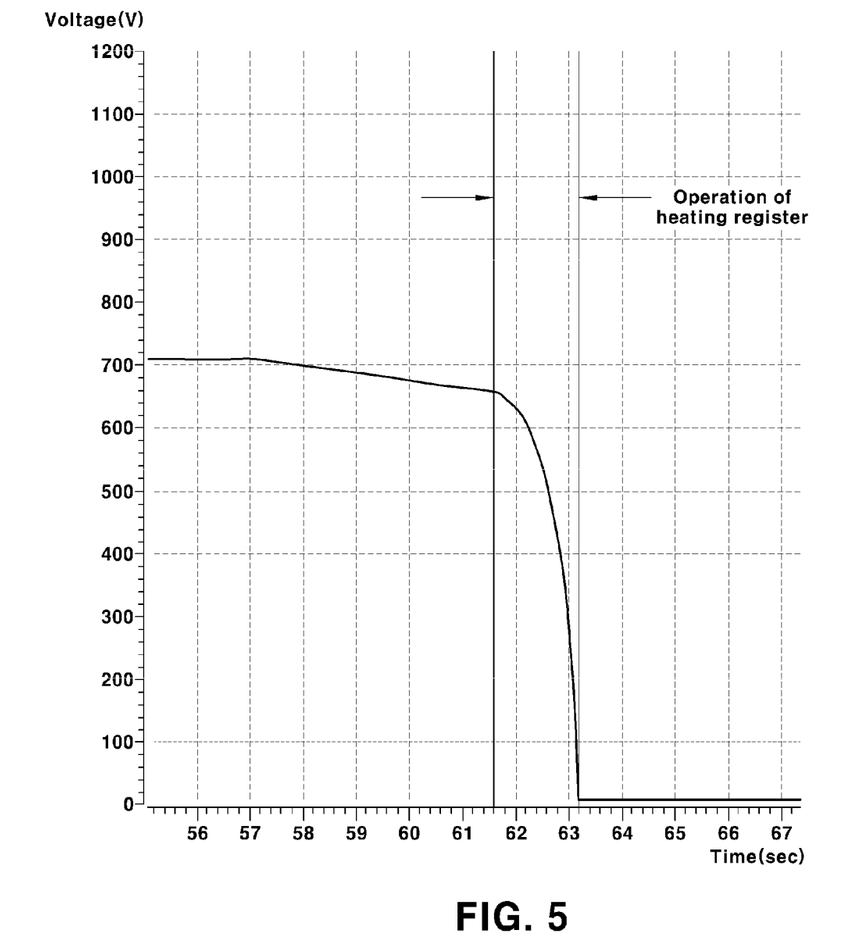
FIG. 5 is a graph illustrating a state in which a remaining voltage is quickly dropped by the control method according to the embodiment of the present disclosure.

FIG. 5 is a graph illustrating a state in which the remaining voltage is quickly dropped by operating the heating resistor in the control method.

Referring to FIG. 5, the remaining electricity in the system is quickly consumed by operating the heating resistor, so that the remaining voltage in the system (the voltage of the input terminal of the MCU) can be quickly dropped to the reference value (first reference value) or less within a few seconds (sec).

The inventive concept has been described in detail with reference to exemplary embodiments thereof. However, it will be appreciated by those skilled in the art that changes may be made in these embodiments without departing from the principles and spirit of the inventive concept, the scope of which is defined in the appended claims and their equivalents.

What is claimed is:

1. A control method for shortening a start time of an in-wheel motor vehicle comprising:
   comparing, by a vehicle control unit (VCU), a DC-link voltage in an inverter for driving a driving motor with a first reference value in a state in which the connection between a main battery and a vehicle system is released;
   checking, by the VCU, a remaining voltage in a vehicle driving system and comparing the checked remaining voltage with a second reference value, when the DC-link voltage in the inverter is no less than the first reference value;
   removing the remaining voltage by operating an electric load in the vehicle to consume remaining electricity in the vehicle system, when the remaining voltage is no less than the second reference value; and
   connecting the main battery to the vehicle system by turning on a pre-charge relay and a main relay,
   wherein the remaining voltage in the vehicle driving system is a voltage at an input or output terminal of a motor control unit (MCU) for controlling the driving motor in the vehicle driving system.

2. The control method of claim 1, wherein the electric load in the vehicle is an electrical heater for indoor heating.

3. The control method of claim 1, wherein the electric load in the vehicle is a heating resistor for heating hot water, which receives operating power applied from the vehicle system.

4. The control method of claim 3, wherein the heating resistor consumes the remaining electricity by operating a chopper under the condition that the remaining voltage is no less than the second reference value and the temperature of water is no more than a reference temperature.

5. The control method of claim 1, wherein, if the DC-link voltage in the inverter is dropped below the first reference value after the electric load in the vehicle is operated, the pre-charge relay and the main relay are turned on.

* * * * *